United States Patent [19]

Kennedy

[11] Patent Number: 4,938,329
[45] Date of Patent: Jul. 3, 1990

[54] SNAP-IN-PLACE WIPER FOR A VISCOUS FLUID CLUTCH

[75] Inventor: Lawrence C. Kennedy, Kettering, Ohio

[73] Assignee: General Motors Corporation, Detroit, Mich.

[21] Appl. No.: 383,474

[22] Filed: Jul. 24, 1989

[51] Int. Cl.⁵ .............................................. F16D 35/02
[52] U.S. Cl. .................................... 192/58 B; 403/71; 403/353
[58] Field of Search ........................... 192/58 B, 82 T; 403/252, 360, 71, 353, 406.1

[56] References Cited

U.S. PATENT DOCUMENTS

| 4,086,987 | 5/1978 | Riley et al. | 192/58 B |
| 4,086,989 | 5/1978 | Spence | 192/58 B |
| 4,103,765 | 8/1978 | Tinholt | 192/58 B |
| 4,564,094 | 1/1986 | Storz | 192/58 B |
| 4,630,721 | 12/1986 | Johnston et al. | 192/58 B |

FOREIGN PATENT DOCUMENTS

| 1957587 | 6/1970 | Fed. Rep. of Germany | 192/58 B |
| 57-190132 | 11/1982 | Japan | 192/58 B |
| 1260906 | 1/1972 | United Kingdom | 403/360 |
| 2174783 | 11/1986 | United Kingdom | 403/252 |

Primary Examiner—Richard M. Lorence
Attorney, Agent, or Firm—A. Michael Tucker

[57] ABSTRACT

A fan clutch assembly for a vehicle includes a pump plate for separating a collecting chamber and a receiving chamber from a reservoir. The pump plate includes an orifice for permitting the passage of fluid from the receiving chamber to the reservoir and for accepting a snap-in-place wiper. The snap-in-place wiper includes a locking element which is receivable in the orifice for quickly securing the wiper to the pump plate.

4 Claims, 3 Drawing Sheets

SNAP-IN-PLACE WIPER FOR A VISCOUS FLUID CLUTCH

BACKGROUND OF THE INVENTION

1. Field of the Invention

The present invention relates generally to a viscous fluid coupling device. In particular, the present invention is concerned with a snap-in-place wiper of a viscous fluid fan clutch for a vehicle.

2. Statement of the Related Art

A thermostatically-controlled viscous fluid clutch assembly for driving and rotating a vehicle cooling fan is well-known. A multi-bladed fan is removably secured to a body of the clutch assembly. The fan and clutch assembly are installed between an accessory pulley of a vehicle engine (typically the water pump pulley) and a radiator. The clutch assembly drives the fan at high speeds close to input speed when cooling is required and permits the fan to rotate at low speeds when cooling is not required. Thermostatic control of the fan through the clutch assembly reduces the load on an engine and the noise caused by fan rotation, resulting in horsepower gain and improved fuel economy.

Generally, a clutch plate, housed within the clutch assembly, having lands and grooves is mated to the body having complementary lands and grooves. A pump plate separates a pair of internally-contained chambers, a receiving chamber and a collecting chamber, from a reservoir. Gates in the pump plate permit selective flow of a viscous fluid from the reservoir to the receiving chamber and into a shear zone between the lands and grooves of the body and clutch plate. Fluid shear in the lands and grooves transfers input torque from the clutch plate to drive the body and the attached fan.

When cooling is not required, gates in the pump plate are closed and the fluid in the shear zone is pumped into the receiving chamber. Orifices in the pump plate permit passage of the fluid from the receiving chamber into the reservoir. The removal of a majority of the fluid from the shear zone substantially reduces the shear between the clutch plate and the body, thereby substantially reducing the rotation of the fan.

It is well-known to provide wiper elements on a surface of the pump plate in communication with the receiving chamber. A wiper, which can be formed as a thin, flat element, is secured to the pump plate (usually by welding) adjacent each pump plate orifice. In other embodiments, a wiper may be formed by stamping a projection in a pump plate. As the wiper encounters fluid in the receiving chamber, an increase in fluid pressure occurs as the wiper creates a fluid dam. The increase in fluid pressure results in increased fluid flow through a pump plate orifice.

To further enhance the pumping ability of a wiper, it is well-known to provide a "scoop" end surface on a wiper. A scoop end surface is a curved or planar surface of the wiper positioned adjacent a pump plate orifice. The scoop surface often includes an inlet or "bay" portion which receives oncoming fluid in the collecting chamber and creates a fluid dam.

In conventional fan clutches, the assembly of a wiper to a pump plate requires two stations. First, a wiper is positioned on the pump plate at a selected location to provide the fluid dam effect. Second, pump plate enters a welding station wherein the wiper is welded to the pump plate. The welding operation increases the manufacturing costs of a pump plate and is time consuming.

The art continues to seek improvements. It is desirable that a viscous fluid fan clutch assembly include wipers mounted on a pump plate to provide the required fluid dam effect and decrease the time to pump fluid from the receiving chamber to the reservoir. Furthermore, it is desirable that a wiper for a pump plate be quickly and economically secured to the pump plate.

SUMMARY OF THE INVENTION

The present invention includes a viscous fluid drive device particularly adaptable for a fan clutch assembly of a vehicle. The present fan clutch assembly utilizes a pump plate having a snap-in-place wiper secured to the pump plate. The wiper can be formed from an economical material and quickly mounted on the pump plate. The snap-in-place wiper provides an effective and economical means of assembling a wiper on a pump plate.

The present invention includes a fan clutch assembly for a vehicle. The clutch assembly includes a pump plate for separating a collecting chamber and a receiving chamber from a reservoir. The pump plate includes an orifice for permitting the passage of fluid from the receiving chamber to the reservoir and for accepting a snap-in-place wiper. The snap-in-place wiper includes a locking element which is receivable in the orifice for quickly securing the wiper to the pump plate.

DETAILED DESCRIPTION OF THE PREFERRED EMBODIMENTS

Figure 1:
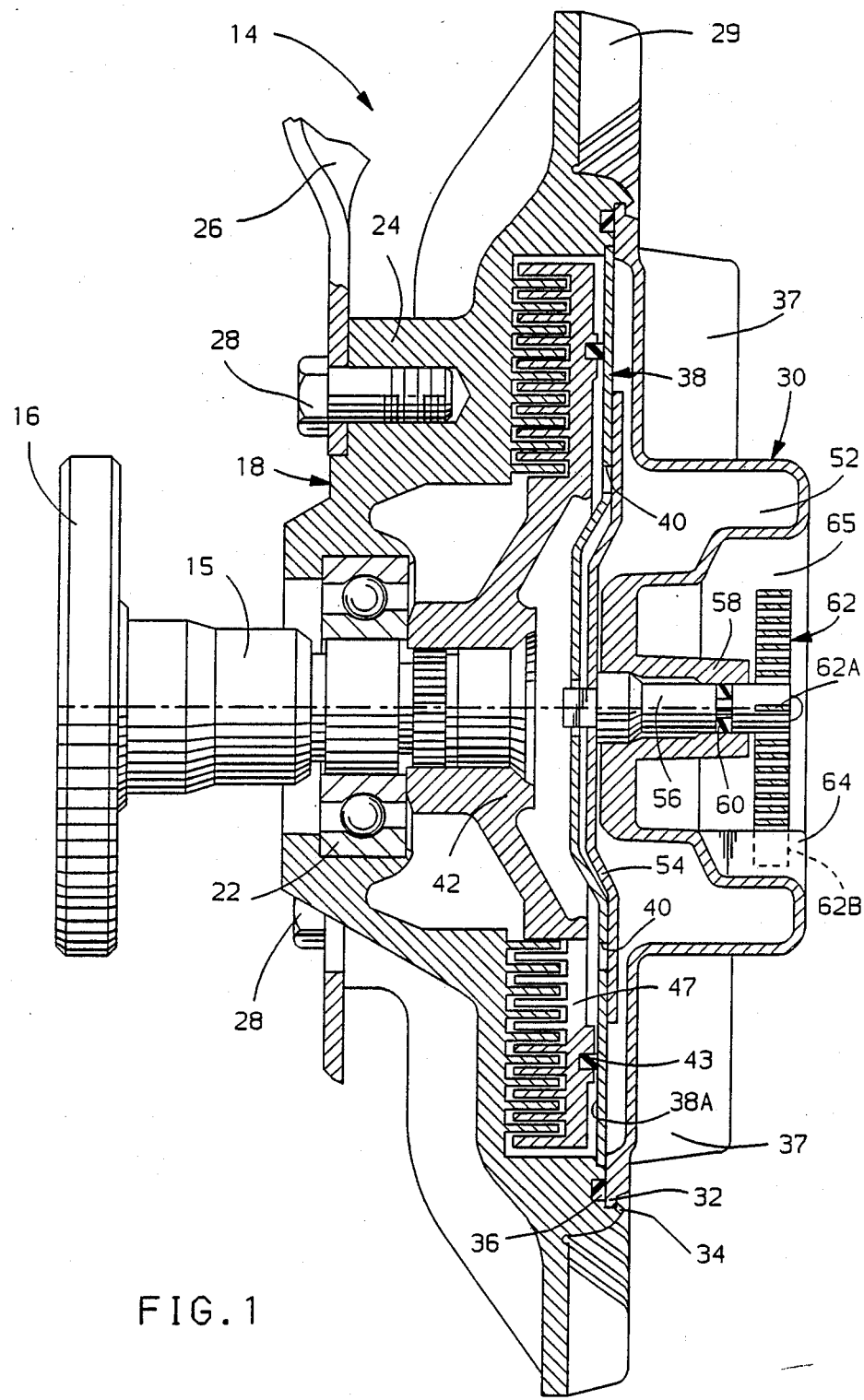
FIG. 1 is a sectional view of a viscous fluid fan clutch and assembly.

FIG. 1 illustrates a multi-bladed fan and clutch assembly, indicated generally at 14, for drawing cooling air through the core of a vehicle radiator (not illustrated) through which engine cooling fluid is circulated. The fan and clutch assembly 14 is mounted on the outboard end of a rotatably driven shaft 15 whose inboard end terminates in a flange 16 which can be secured to a conventional engine-driven water pump pulley (not illustrated). The fan and clutch assembly 14 includes a dished main body 18 centrally mounted for rotation on shaft 15 by a bearing 22. The main body 18 is formed with a plurality of radially extending bosses 24 to which a multi-bladed fan 26 (partially illustrated in FIG. 1) is attached by threaded fasteners 28. A plurality of fins 29 is provided on the outer surface of the main body 18 to dissipate heat transferred from a viscous fluid housed by the assembly 14.

A cover plate 30 is mounted to a front face of and cooperates with the main body 18 to form a housing and reservoir as described below. The cover plate 30 is a dished member whose annular outer edge 32 is secured to the main body 18 by an annular retainer lip 34 spun over from the material of the main body 18. An annular seal 36, e.g. a formed-in-place gasket, is interposed between the edge 32 and the front face of the main body 18 to prevent leakage of the fluid from the interior of the assembly 14. A plurality of fins 37 is provided on the outer surface of the cover plate 30 to dissipate heat transferred from the fluid.

Disposed behind the cover plate 30 is a disk-like annular pump plate 38 whose diameter is slightly less than that of the cover plate 30. The pump plate 38 is drivingly secured to the main body 18 as it is trapped on an annular shoulder 39 (FIG. 2) on the main body 18 by the cover plate 30.

The pump plate 38 has a pair of diametrically opposed passages or gates 40 provided in its central portion. When opened, gates 40 allow the fluid to flow into a collecting chamber 41 (illustrated best in FIG. 2) formed and bounded by the pump plate 38, a clutch plate 42 and a divider ring 43. The clutch plate 42 is mounted on shaft 15 at a central opening and provides for the hydraulic drive of the main body 18 and attached fan 26 as described below. Ring 43, preferably formed from TEFLON, is mounted in an annular groove 43A in the outer or front face of the clutch plate 42 and improves pump-out or clutch disengagement as described below. A divider ring of this type is described in U.S. Pat. No. 4,741,421, issued May 3, 1988, assigned to the assignee of this invention and hereby incorporated by reference.

Figure 2:
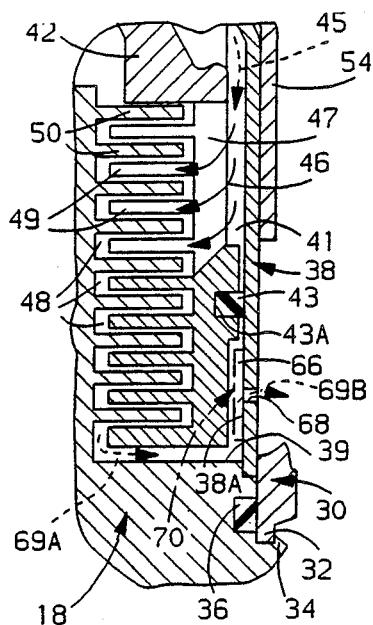
FIG. 2 is an enlarged view of a portion of the clutch assembly of FIG. 1 wherein the pump plate has been rotated and parts removed therefrom to illustrate fluid flow from a receiving chamber through a pump plate orifice.
Figure 3:
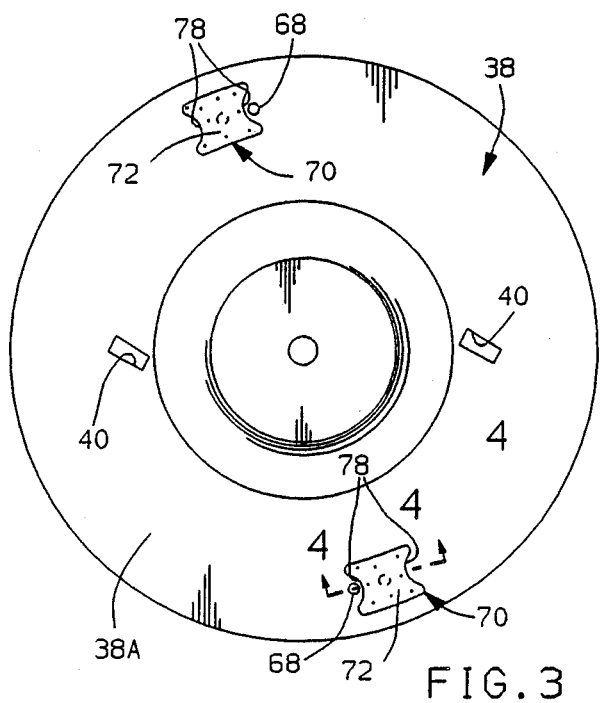
FIG. 3 is a top plan view of a pump plate removed from the clutch assembly of FIG. 1 and illustrating a first embodiment of snap-in-place wipers mounted adjacent orifices.
Figure 4:
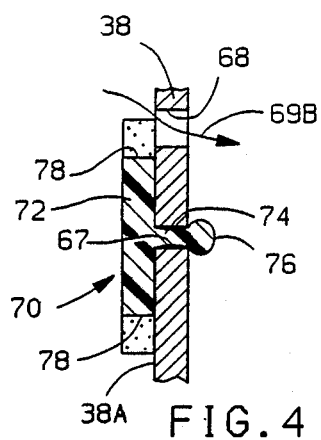
FIG. 4 is an enlarged, sectional view taken along line 4—4 of FIG. 3 illustrating the snap-in-place wiper mounted on pump plate adjacent the orifice.
Figure 5:
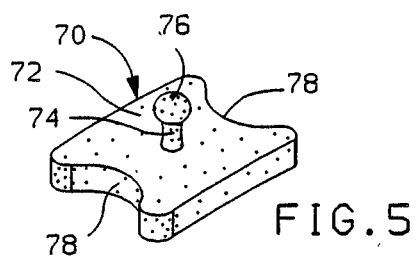
FIG. 5 is an enlarged perspective view of one of the snap-in-place wipers illustrated in FIG. 3 removed from the plate to illustrate a locking member.
Figure 6:
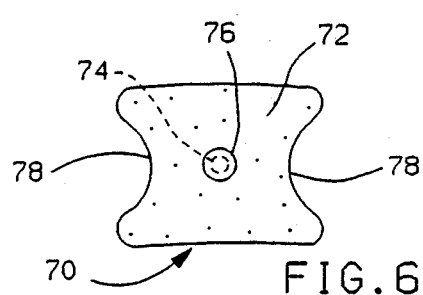
FIG. 6 is a top plan view of the snap-in-place wiper of FIG. 4

As illustrated in FIG. 2, the centrifugal forces of the rotating assembly 14 force the axial fluid flow through gate 40 to radial fluid flow as indicated by directional arrows 45 into the collecting chamber 41.

Axial fluid flow, as indicated by directional arrows 46, is forced through well-known passages 47 in the clutch plate 42 into an annular serpentine fluid shear zone 48 formed by the grooves or spaces between interleaved concentric annular ridges or lands 49 formed in a rear face of a clutch plate 42 and complementary concentric annular ridges or lands 50 formed on an interior surface of the main body 18.

Fluid sheared in the shear zone 48 transmits input torque from the rotatably driven clutch plate 42, centrally splined on shaft 15, to provide for the hydraulic drive of main body 18 and the attached bladed fan 26 for cooling fan operation. Due to slippage between the clutch plate 42 and the main body 18, the fan speed is always less than the input speed from the shaft 15.

A reservoir 52 formed between the cover plate 30 and the pump plate 38 contains a specified quantity of viscous fluid. The opening and closing of the gates 40 to control the supply of the fluid into the collecting chamber 41 is provided by a valve plate 54 that extends from driving connection with a center shaft 56 rotatably mounted in a tubular hub portion 58 formed in the central portion of the cover plate 30. An O-ring seal 60 is mounted in an annular groove in the center shaft 56 and makes peripheral contact with the inner wall of the hub portion 58 to prevent fluid leakage to the exterior of the assembly 14.

A helically-wound bimetallic thermostatic valve control element 62 includes an inner end portion 62A mounted in a transverse slot formed in a forward end of the center shaft 56 and an outer end portion 62B mounted in a retaining tab 64 formed in the cover plate 30. Preferably, valve control element 62 is recessed within a cavity 65 surrounding the hub portion 58. Through this construction, an increase or decrease in ambient air temperature causes the winding or unwinding of the valve control element 62, resulting in rotation of the center shaft 56 and the attached valve plate 54. The actuation of valve plate 54 to control the opening and closing of gates 40 is well-known and described in U.S. Pat. No. 4,741,421 and hereby incorporated by reference.

In FIG. 2, fluid indicated by directional arrow 69A is forced radially outwardly by centrifugal forces and exits the shear zone 48 into a receiving chamber 66 formed and bounded by the pump plate 38, the clutch plate 42 and the divider ring 43. Fluid, indicated by directional arrow 69B, in the receiving chamber 66 is returned to the reservoir 52 through a plurality of orifices 68 provided in a portion of the pump plate 38 in communication with the receiving chamber 66. The return of fluid from the receiving chamber 66 to the reservoir 52 is well-known and described in U.S. Pat. No. 4,741,421 and hereby incorporated by reference.

In a first preferred embodiment illustrated in FIGS. 3–6, a pair of snap-in-place wipers, each indicated generally at 70, are mounted on a rear surface 38A, i.e. the surface in communication with the receiving chamber 66, of the pump plate 38 outbound of the divider ring 43. For balance, it is preferred that the wipers 70 are diametrically opposed from each other. In other embodiments, a plurality of wipers 70 can be provided on the pump plate 38.

Each wiper 70 includes a planar body 72 having a stem 74 projecting from one surface. Each stem 74 includes a locking bulb 76 formed from a resiliently compressible material. Preferably, each stem 74 is a cylindrical member having a diameter less than the locking bulb 76. If desired, well-known scoop surfaces 78 can be provided on the wiper 72. Wipers 70 can be formed from any suitable material, e.g. a plastic material, preferably TEFLON, or a metal.

To mount a wiper 70 on the pump plate 38, the bulb 76 is inserted into an aperture 67 provided on the pump plate 38 adjacent each orifice 68. The wiper body 72 is forced next to the pump plate 38 so that the bulb 76 is resiliently compressed and passes through the aperture 67 and the stem 74 is received in the aperture 67. If desired, the wiper 70 can be removed from the pump plate 38 by applying a force to the body 72 to cause the bulb 76 to be resiliently compressed and squeezed through the aperture 67.

The aperture 67 and the orifice 68 can be provided by any suitable means, e.g. by punching. In certain applications, the diameter of the aperture 67 and the orifice 68 will be equal. In such applications, the aperture 67 or the orifice 68 can receive the wiper 70, depending upon the direction of rotation of the pump plate 38, while the remaining opening serves as an orifice.

Figure 7:
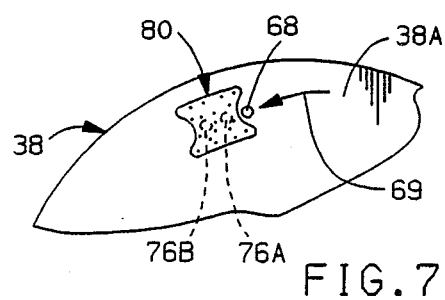
FIG. 7 is a top plan view of a second embodiment of the present snap-in-place wiper having a pair of locking a pump plate.
Figures 8A, 8B, 8C, 8D:
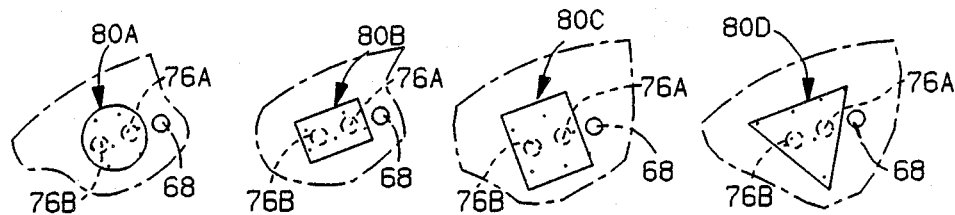
FIGS. 8A, 8B, 8C and 8D are top plan views of various profiles of the second embodiment of the present snap-in-place wiper.

A second preferred embodiment of a snap-in-place wiper, indicated generally at 80, is illustrated in FIG. 7. The wiper 80 includes a pair of stems (not illustrated) similar to stem 74 projecting from a planar surface of the wiper 80 wherein each stem terminates in a bulb 76A and 76B, respectively, as described above. In this embodiment, a pair of complementary apertures (not illustrated) similar to aperture 67 are provided on the surface of the pump plate 38 adjacent the orifice 68. The wiper 80 encounters on-coming fluid indicated by directional arrow 69 contained in the receiving chamber 66. It will be understood that a snap-on wiper having a pair of locking elements can be designed in a variety of profiles 80A-80D as illustrated in FIGS. 8A-8D. Each profile 80A-80D can be selected to provide a desired damming effect and pump-out rate of fluid from the receiving chamber 66 in a well-known manner.

Figure 9:
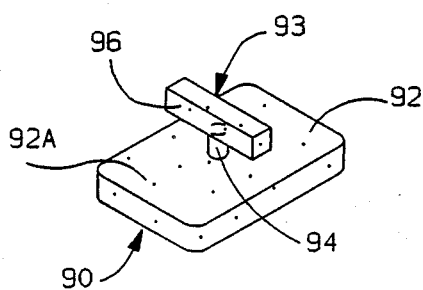
FIG. 9 is an enlarged perspective view of a third preferred embodiment of the present snap-in-place wiper prior to installation on the pump plate illustrating a T-shaped locking member.

A third preferred embodiment of the present snap-in-place wiper is indicated generally at 90 and illustrated in the enlarged perspective view of FIG. 9. The wiper 90 includes a body 92 having a planar surface 92A for contact with the pump plate 38. A T-shaped leg 93 having a stem 94 and a cross bar 96 projects from the planar surface 92A of the wiper 90. Preferably, the wiper 90 is constructed from a moldable material.

Figure 10:
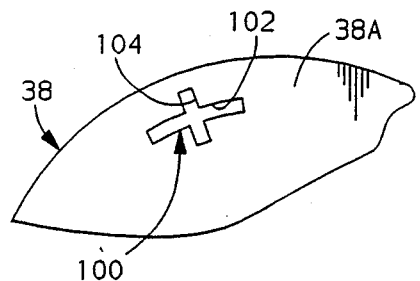
FIG. 10 is an enlarged top plan view of a pump plate having an orifice for receiving the snap-in-place wiper of FIG. 9.
Figure 11:
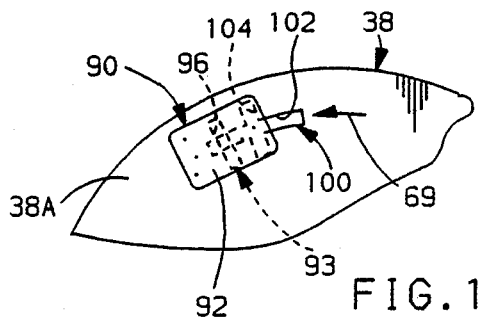
FIG. 11 is a top plan view illustrating the wiper of FIG. 9 mounted on the pump plate of FIG. 10.

As illustrated in FIG. 10, a cross-shaped orifice 100 having a longitudinal channel 102 and a cross bar channel 104 is provided on the pump plate 38 to receive the wiper 90. To mount the wiper in the orifice 100, the cross bar 96 is received in the complementary cross bar channel 104 of the orifice 100. Depending upon the direction of rotation of the pump plate 38, the wiper 90 is slid to one end of the longitudinal channel 104. In FIG. 11, the wiper 90 has been slid toward the lower end of the longitudinal channel 102 and encounters on-coming fluid indicated by directional arrow 69 contained in the receiving chamber 66. The uncovered portion of the longitudinal channel 102 acts as an orifice during operation of the pump plate 38. As the wiper 90 is slid into its resting place, the cross bar 96 creates an interference fit between the body 92 and the pump plate 38. In this manner, the wiper 90 is held in place during operation of the pump plate 38. This embodiment is adaptable for either clockwise or counterclockwise rotation of a fan clutch assembly 14.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A pump plate assembly for separating a receiving chamber and a reservoir of a viscous fluid clutch, wherein the receiving chamber receives fluid from a shear zone in the clutch, the pump plate assembly comprising:
    (a) a plate member having a front surface in communication with the reservoir and a rear surface in communication with the receiving chamber;
    (b) means provided in the plate member for permitting the passage of a fluid from the receiving chamber to the reservoir including of least a pair of diametrically opposed orifices;
    (c) an aperture provided in said plate member adjacent each orifice; and
    (d) a wiper removably mounted on said plate member adjacent each orifice, wherein each wiper includes:
        (i) a planar surface in engagement with the plate member rear surface, and
        (ii) a stem projecting from the planar surface through a respective one of said apertures and terminating in a resiliently compressible bulb engaging the plate member front surface.

2. The pump plate assembly as specified in claim 1, wherein:
    (a) each wiper includes at least a second stem projecting from the planar surface and terminating in a resiliently compressible bulb; and
    (b) the plate member includes additional apertures aligned to receive respective bulbs.

3. The pump plate assembly as specified in claim 2 wherein each orifice and respective apertures are formed with substantially similar circumferences so that the bulbs of the respective stems can be selectively inserted into the orifices and apertures.

4. A pump plate assembly for separating a receiving chamber and a reservoir of a viscous fluid clutch, wherein the receiving chamber receives fluid from a shear zone in the clutch, the pump plate assembly comprising:
    (a) a plate member having a front surface in communication with the reservoir and a rear surface in communication with the receiving chamber;
    (b) means provided in the plate member for permitting the passage of fluid from the receiving chamber to the reservoir including at least a pair of diametrically opposed cross-shaped orifices, wherein each orifice includes a longitudinal channel and an intersecting cross channel; and
    (c) a wiper removably mounted to the plate member at each orifice, each wiper including
        (i) a planar surface in engagement with the plate member rear surface, and
        (ii) a stem projecting from the planar surface through a respective one of said longitudinal channels and terminating in a cross bar complementary to the cross channel, said cross bar engaging said plate member front surface;
    whereby a portion of the longitudinal channel remains uncovered after each wiper is slid to its selected location in the longitudinal channel.

* * * * *